United States Patent
Chateau et al.

(10) Patent No.: US 7,299,358 B2
(45) Date of Patent: Nov. 20, 2007

(54) INDIRECT DATA PROTECTION USING RANDOM KEY ENCRYPTION

(75) Inventors: Alain Chateau, Cagnes sur Mer (FR); Jerome Azema, Villeneuve-Loubet (FR); Constantin Haidamous, Rosny sous Bois (FR)

(73) Assignee: Texas Instruments Incorporated, Dallas, TX (US)

( * ) Notice: Subject to any disclaimer, the term of this patent is extended or adjusted under 35 U.S.C. 154(b) by 762 days.

(21) Appl. No.: 10/619,031

(22) Filed: Jul. 14, 2003

(65) Prior Publication Data
US 2004/0054907 A1 Mar. 18, 2004

Related U.S. Application Data

(60) Provisional application No. 60/399,592, filed on Jul. 30, 2002.

(30) Foreign Application Priority Data
Dec. 10, 2002 (EP) .................................. 02293057

(51) Int. Cl.
*H04L 9/00* (2006.01)
(52) U.S. Cl. ...................... 713/176; 713/165; 713/187; 713/193; 726/26; 726/27
(58) Field of Classification Search ...................... None
See application file for complete search history.

(56) References Cited

U.S. PATENT DOCUMENTS 4,238,854 A * 12/1980 Ehrsam et al. .............. 713/165
5,416,840 A * 5/1995 Cane et al. .................... 705/52
5,421,006 A 5/1995 Jablon et al.
5,944,821 A 8/1999 Angelo
5,958,051 A * 9/1999 Renaud et al. ................ 726/22
6,014,745 A * 1/2000 Ashe .......................... 713/193
6,931,530 B2 * 8/2005 Pham et al. ................. 713/165
7,055,175 B1 * 5/2006 Le Pennec et al. ........... 726/24

(Continued)

FOREIGN PATENT DOCUMENTS

EP 0 816 970 A 1/1998

(Continued)

*Primary Examiner*—Gilberto Barron, Jr.
*Assistant Examiner*—Minh Dinh
(74) *Attorney, Agent, or Firm*—Dolly Y. Wu; W. James Brady; Frederick J. Telecky, Jr.

(57) ABSTRACT

A computing platform (10) protects system firmware (30) using a manufacturer certificate (36). The manufacturer certificate binds the system firmware (30) to the particular computing platform (10). The manufacturer certificate may also store configuration parameters and device identification numbers. A secure run-time platform data checker (200) and a secure run-time checker (202) check the system firmware during operation of the computing platform (10) to ensure that the system firmware (30) or information in the manufacturer certificate (36) has not been altered. Application software files (32) and data files (34) are bound to the particular computing device (10) by a platform certificate (38). A key generator may be used to generate a random key and an encrypted key may be generated by encrypting the random key using a secret identification number associated with the particular computing platform (10). Only the encrypted key is stored in the platform certificate (36).

15 Claims, 10 Drawing Sheets

U.S. PATENT DOCUMENTS 7,082,615 B1 * 7/2006 Ellison et al. ............... 726/26
7,114,082 B2 * 9/2006 Klein ......................... 713/193
7,174,457 B1 * 2/2007 England et al. ............. 713/168

FOREIGN PATENT DOCUMENTS

| EP | 0 843 249 A | 5/1998 |
|----|-------------|--------|
| EP | 0 849 657 A | 6/1998 |
| WO | WO 00 10283 A | 2/2000 |
| WO | WO 01 24012 A | 4/2001 |

* cited by examiner

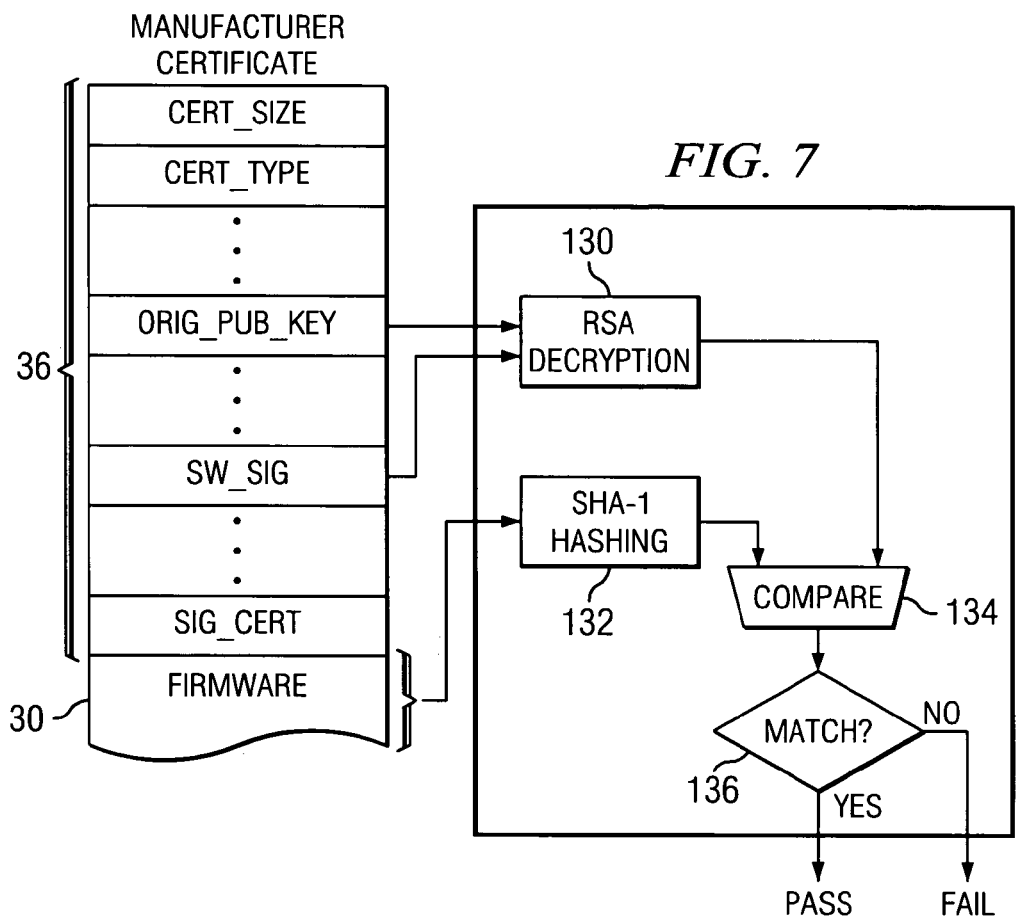
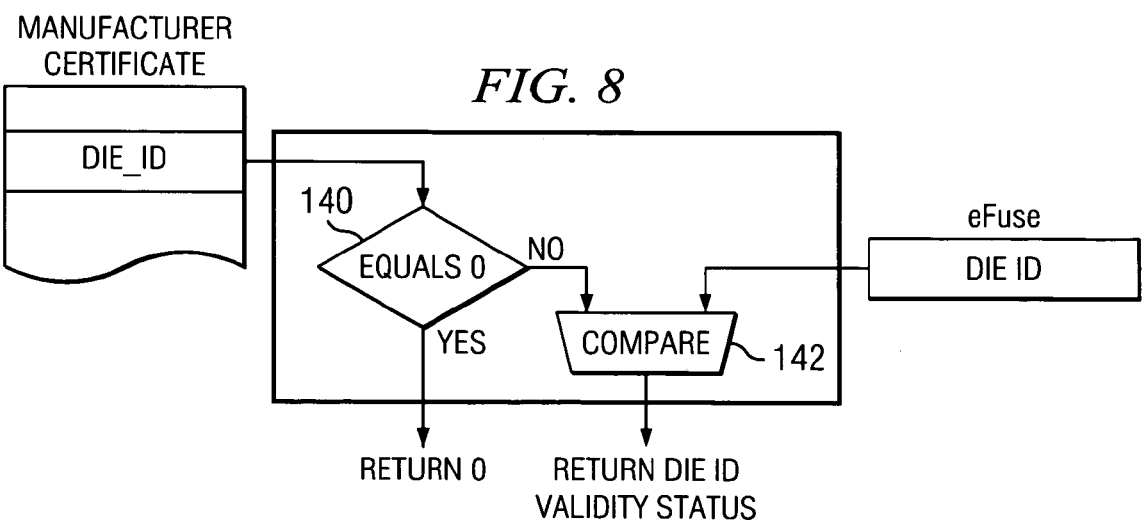

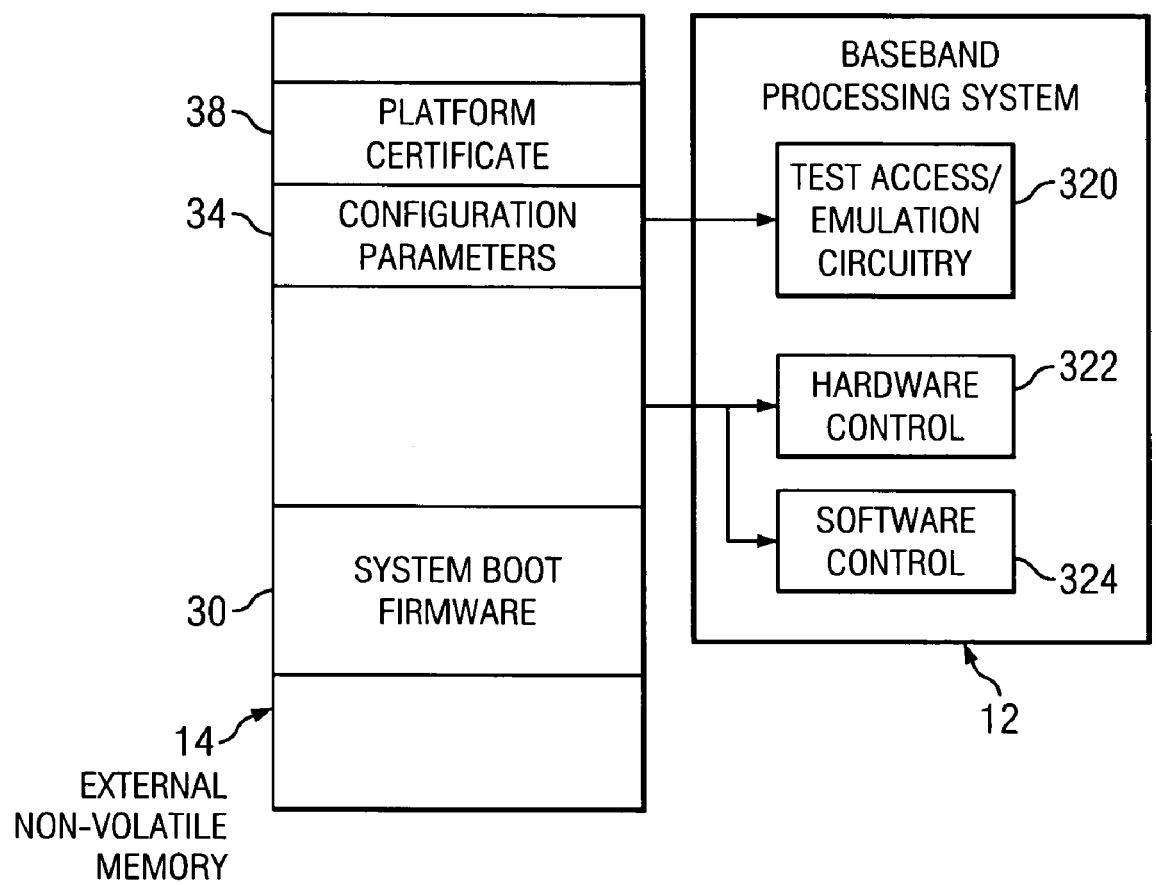
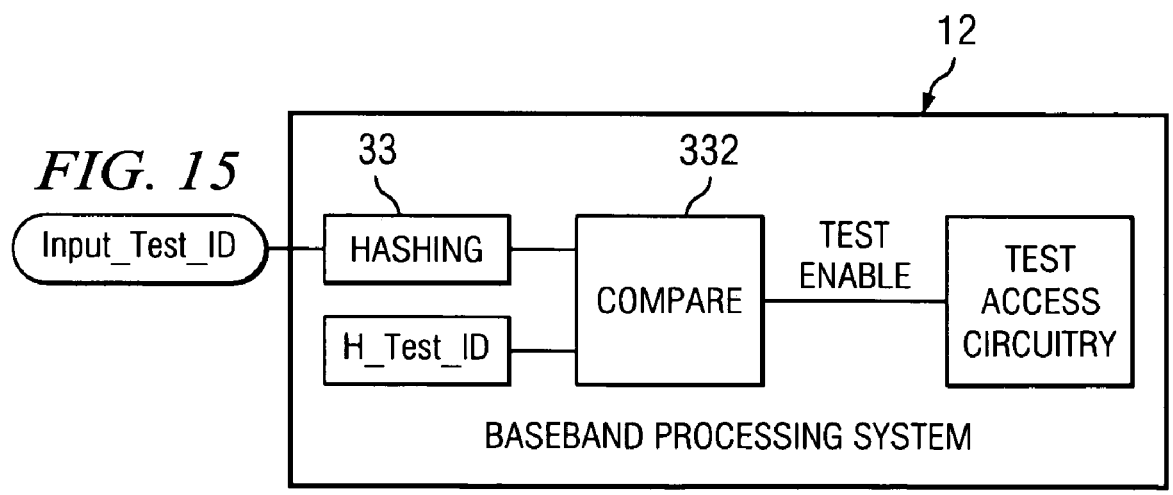

INDIRECT DATA PROTECTION USING RANDOM KEY ENCRYPTION

CROSS-REFERENCE TO RELATED APPLICATIONS

This application claims the benefit of the filing date of copending provisional application U.S. Ser. No. 60/399,592, filed Jul. 30, 2002, entitled "Firmware Run-Time Authentication" to Balard et al.

This application also claims priority under the Paris Convention for the Protection of Intellectual Property of Application Number 02293057.2, filed Dec. 10, 2002 in the European Patent Office. No foreign application for this same subject matter has been filed that has a filing date before Dec. 10, 2002.

STATEMENT OF FEDERALLY SPONSORED RESEARCH OR DEVELOPMENT

Not Applicable

BACKGROUND OF THE INVENTION

1. TECHNICAL FIELD

This invention relates in general to processing devices and, more particularly, to a secure computing system.

2. Description of the Related Art

Present day computing devices take many forms and shapes. Traditional computing devices include personal computers. More recently, mobile computing devices, such as PDA (personal digital assistants) and smart phones have blurred the distinction between computing devices and telecommunications devices. Further, computing devices are being used in manners virtually invisible to the user, such as controllers in automobiles.

Manufacturers of computing devices, or parts of computing devices such as processors, have heretofore been unable to provide security to the operation of their device. One particular well-known security hazard involves attacks on a computing device by third parties. Using a variety of techniques, an attacker may change system files, application files, or data in the computing device. In some cases, such attacks are an annoyance; in other cases, the attacks can result in tremendous expenses to the owner.

Not all unauthorized modifications of a computing device are caused by third parties. Some modifications of the intended operation of a computing device are caused by the user. For example, a user may change a device's intended settings, sometimes with the aid of unauthorized software, to "improve" the operation of a device. In some cases, such as the modification of firmware on an automobile controller, such changes could be extremely dangerous.

In other cases, a user may want to transfer data or programs from a first device to a second device. This may be improper due to copyright restrictions or may involve moving software to a platform where it is not stable.

Manufacturers are increasingly aware of the need to verify the origin and integrity of system firmware, software and data. While some mechanisms have had some success, such as digital certificates to verify the origin of a software provider, these measures have proven incomplete and easily circumvented, particular by sophisticated attackers or users.

Therefore, a need has arisen for a secure computing platform.

BRIEF SUMMARY OF THE INVENTION

In the present invention, security is provided to electronic files stored in an externally-accessible memory of a computing device using a secret identification number for the computing device in a secure memory that is not externally-accessible. A random key is associated with a selected electronic file and an encoded key is generated by symmetrically encrypting the random key using the secret identification number. A digital certificate is associated with the electronic file, where the digital certificate contains the encrypted key, such that the electronic file can be accessed only after restoring the random key through decryption of the encrypted key with the secret identification number.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 7 illustrates a flow chart authenticating the firmware bound to a manufacturer certificate;

FIG. 8 is a flow chart describing die identification code verification in a manufacturer certificate;

FIG. 14 illustrates a variation on FIG. 13 where configuration data is stored in a data file protected by a platform certificate; and FIG. 15 illustrates an alternative design for accessing the device 10 is a certain mode, such as a test mode.

DETAILED DESCRIPTION OF THE INVENTION

The present invention is best understood in relation to FIGS. 1-15 of the drawings, like numerals being used for like elements of the various drawings.

Figure 1:
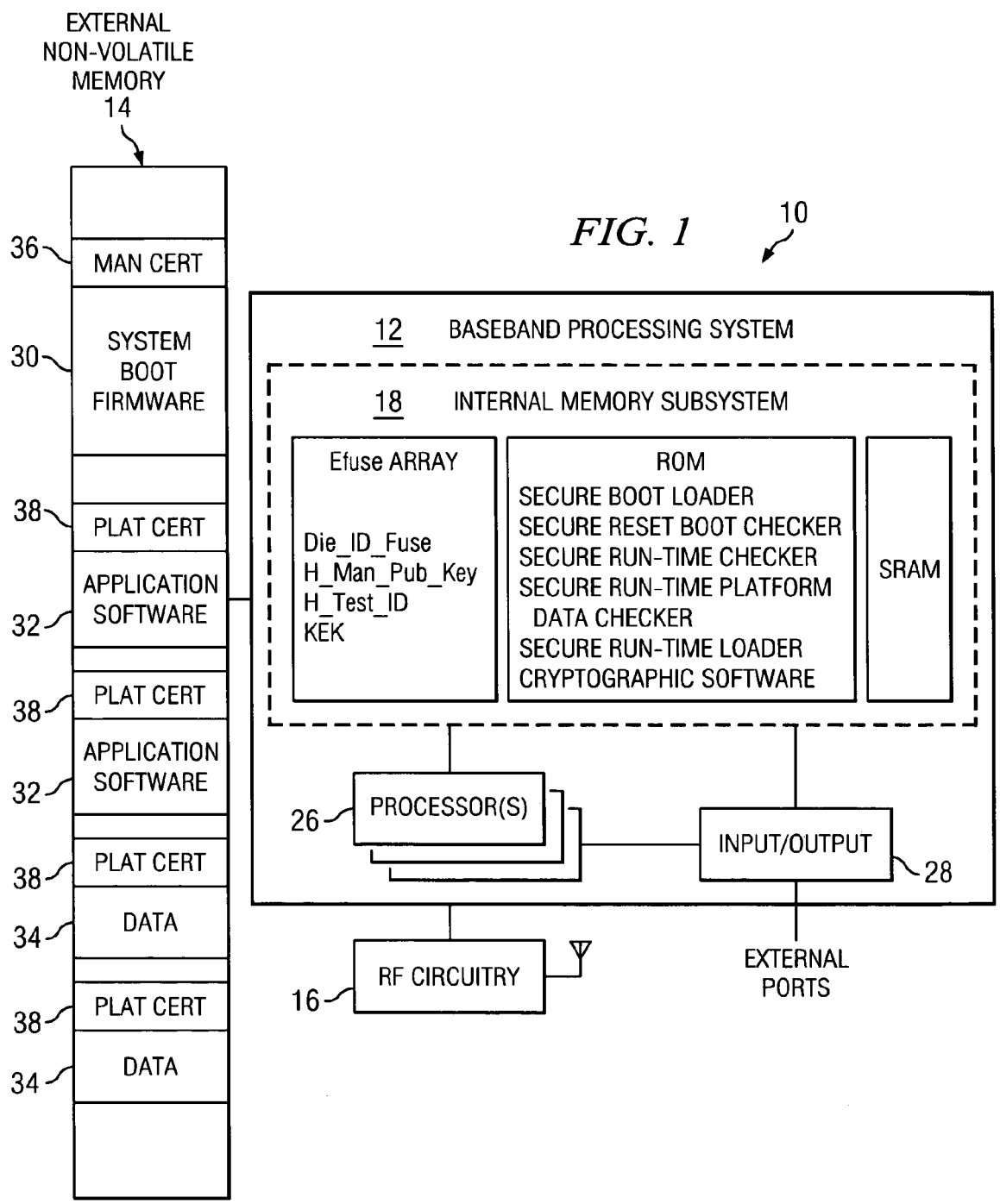
FIG. 1 illustrates a basic block diagram showing various protection mechanisms used to protect firmware, application software, and data in a mobile computing environment.

FIG. 1 illustrates a basic block diagram showing various protection mechanisms used to protect firmware, application software, and data in a mobile computing environment. While the invention is discussed herein with regard to a mobile computing device, such as a mobile phone or PDA, it is applicable to other computing devices as well.

The circuitry of mobile computing device 10 of FIG. 1 is divided into three major blocks. A baseband processing system 12, an external non-volatile memory system 14, and a RF (radio frequency) system 16. The baseband processing system is responsible for processing data prior to RF modulation. In FIG. 1, the baseband processing system 12 embeds an internal memory subsystem 18, including SRAM (static random access memory) 20, ROM (read-only memory) 22 and a fused memory array (eFuse) 24. One or more processing devices 26, such as general purpose processors, digital signal processors, and coprocessors, are coupled to the internal memory subsystem 18. Input/Output (I/O) circuitry 28 is coupled to the processor(s) 26 and internal memory subsystem 18.

Firmware 30, application software 32 and data files 34 are stored in the external non-volatile memory system 14. Firmware 30 is the basic system code stored on the device by the manufacturer prior to sale. The firmware 30 is permanently resident on the platform, although it may be updated by the manufacturer to add functionality or to correct errors. In many cases, it is extremely important that only the firmware 30 placed on the device 10 by the manufacturer is used, and that the firmware not be modified or replaced by anyone other than the manufacturer or someone working under the authority of the manufacturer. Hence, security is an extremely important issue with regard to firmware 30. Additionally, it is important that unauthorized firmware is not executed. Security may also be an issue with regard to application software 32 and data files 34. For application software 32 and data files 34, it is often important to ensure the integrity of these files; for example, it may be desirable to ensure that the files are not modified, deleted or replaced by other "virus" software. Also, it is often important to prevent the copying of application software 32 and data files 34 (such as music and video files) to protect the copyrights of the owner of the underlying work.

As shown in FIG. 1, two types of protection mechanisms may be used to protect the contents of the external memory, which is often easily accessible. With regard to the firmware, a "manufacturer" certificate 36 binds the firmware to the particular computing device 10 (multiple manufacturer certificates may be bound to respective firmware tasks). Similarly, application software 32 and data files 34 are bound to the particular computing device 10 by respective "platform" certificates 38. These certificates, described in detail below, can be used to prevent modification of (and optionally to preserve the confidentiality of) the firmware, application software and data, and further prevent copying the firmware, application software and data to another device.

The security features described herein make use of several encryption techniques. In "symmetric-key" (or "secret key") cryptography, the same secret key is used for both encryption and decryption. An example of a symmetric-key cryptosystem is DES (Data Encryption Standard). In "asymmetric" (or "public-key") cryptography, a pair of keys are used, a secret key and a public key. A key generation algorithm produces the matched pair of keys, such that information may be encrypted using the public key (which may be published to prospective senders) and decrypted using the private key (which is maintained in secret by the recipient) and, conversely, information encrypted with the private key can be decrypted with the public key. Deducing the private key from the public key is not computationally feasible. Using an asymmetric cryptosystem, parties with no prior security arrangement can exchange information, since the private key need not be sent through a secure channel. RSA encryption (developed by RSA Security, Inc.) is an example of public key cryptography.

A one-way hash function takes a variable-length input and produces a fixed-length output, known as a "message digest" or "hash". The hash function ensures that, if the information is changed in any way, an entirely different output value is produced. Hash algorithms are typically used in verifying the integrity of data. SHA-1 (160 bit hash) and MD5 (128 bit hash) are examples of one-way hash functions.

A digital signature enables the recipient of information to verify the authenticity of the information's origin, and also verify that the information is intact. Typically, the sender signs a message by computing its hash and encrypting the hash with the sender's private key. The recipient verifies the signature on the message by decrypting it with sender's public key (thus obtaining the transmitted hash), computing the hash of the received message, and comparing the two. Thus, public key digital signatures provide authentication and data integrity. A digital signature also provides non-repudiation, which means that it prevents the sender from disclaiming the origin of the information. DSA (Digital Signature Algorithm) is an example of a digital signature cryptosystem.

One issue with public key cryptosystems is that users must be constantly vigilant to ensure that they are encrypting or decrypting with the correct public key, to be protected against man-in-the-middle attacks (where an attacker intercepts packets in a data stream, modifies the packets, and passes them to their intended destination by claiming to be the original sender). A digital certificate is a form of digital passport or credential that simplifies the task of establishing whether a public key truly belongs to the purported owner. In its simplest form, a certificate is the user's public key that has been digitally signed by someone trusted, such as a certificate authority. A certificate can also contain additional information such as version number, user ID number, expiration date, and so on.

Certain code and keys are maintained internally on the baseband processing system 12 in support of other security features. Several system programs are located in ROM 22, in order to prevent any malicious tampering. The programs include the Secure Boot Loader (described in detail in connection with FIG. 3), the Secure Reset Boot Checker (described in detail in connection with FIG. 3), the Secure Run-Time Platform Data Checker (described in detail in connection with FIG. 9), the Secure Run-Time Checker (described in detail in connection with FIG. 9), the Secure Run-Time Loader (described in detail in connection with FIGS. 10 and 11), and various cryptographic software to support data encryption and hashing. Some or all of the cryptographic techniques may be performed in conjunction with a dedicated crypto-processor.

In addition, in the preferred embodiment, certain system data is maintained on the eFuse Array 24 (or other permanent memory internal to the baseband processing system 12). After the data is written to the array, further writing to the particular location is disabled, such that the data cannot be overwritten.

A die identification number is a unique number associated with each individual device. In the preferred embodiment, this number is stored as DIE_ID_FUSE in the eFuse array 24 at the time of manufacture. This identification code is not considered secret and may be read by non-secure software.

The manufacturer's public key (the "manufacturer" being the manufacture of device 10) is also stored in the eFuse array 24 after hashing as H_Man_Pub_Key. The location storing H_Man_Pub_Key does not need to be protected from external access, since the manufacturer's public key is not secret; however, it should be protected from modification after writing. Use of H_Man_Pub_Key is discussed in greater detail in connection with FIG. 4. It should be noted that the hashing of the manufacturer's public key is optional; hashing is used to compact long keys to reduce the amount of memory needed to store the key.

A test ID, or other access ID, may also be hashed and stored in the eFuse array 24. The hashed test ID (H_Test_ID) may be used to prevent unauthorized access to the device in test mode, where certain protections are disabled. This aspect is discussed in greater detail in connection with FIG. 15.

A Key Encryption Key (KEK) is a secret key preferably generated by a random number generator internal to the baseband processor at the time of production of the device. The KEK is stored in the eFuse array 24 and is not modifiable or externally accessible. The KEK for a particular device, therefore, cannot be determined even by the manufacturer. The KEK is used to dynamically provide additional encrypted keys for the platform certificates 38, as described in greater detail in connection with FIGS. 10 and 11.

Figure 2:
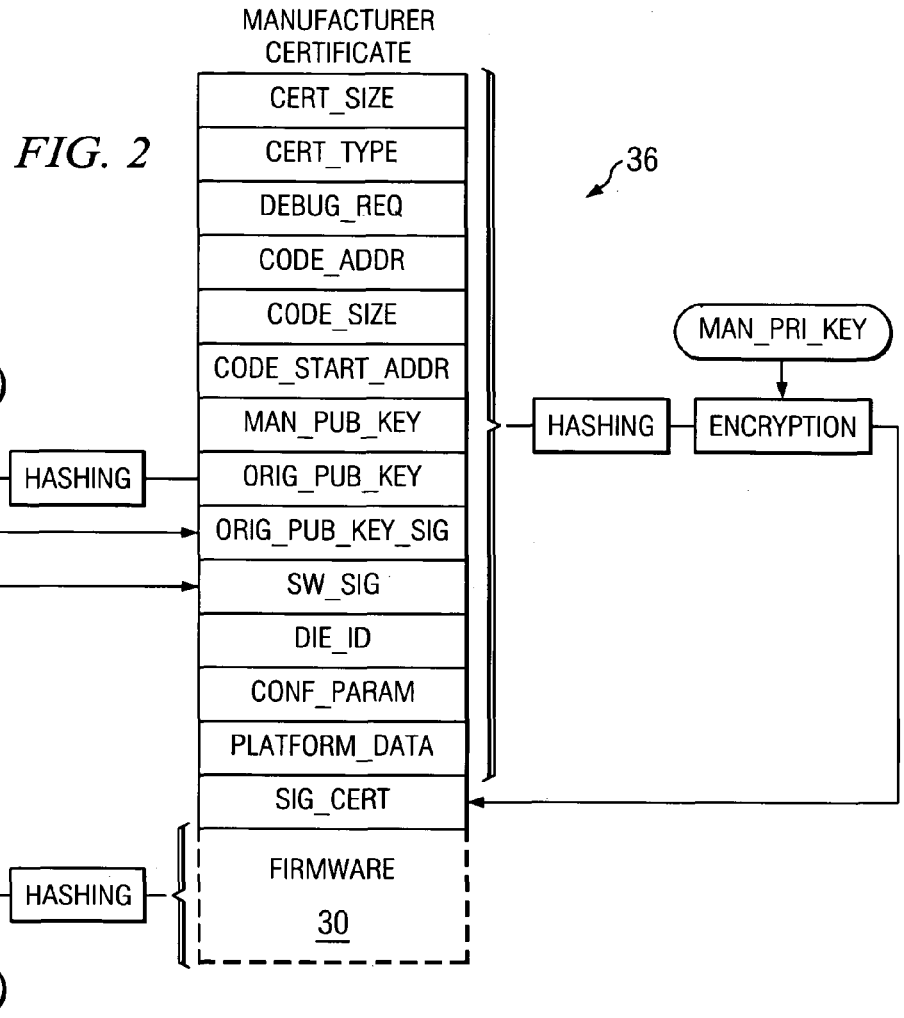
FIG. 2 illustrates a preferred embodiment for a manufacturer certificate shown in FIG. 1.

FIG. 2 illustrates a preferred embodiment for a manufacturer certificate 36. It should be understood that a manufacture certificate 36 for a particular device could contain more or less fields than the embodiment shown in FIG. 2. A summary of the fields of the for the manufacturer certificate 36 of FIG. 2 are described in Table 1.

TABLE 1

Manufacturer Certificate

| Field Name | Function | Security |
|---|---|---|
| CERT_SIZE | Certificate's size (in bytes) | |
| CERT_TYPE | Certificate's type: Manufacturer | |
| DEBUG_REQ | Debug request | |
| CODE_ADDR | Address where is stored the code to verify | |
| CODE_SIZE | Size of the software module (in bytes) | |
| CODE_START_ADDR | Address of software entry point | |
| MAN_PUB_KEY | Manufacturer's Public Key | |
| ORIG_PUB_KEY | Originator's Public Key | |
| ORIG_PUB_KEY_SIG | Signature of Originator's Public Key by the Manufacturer | Originator's Public Key, hashed and encrypted using Manufacturer's private key |
| SW_SIG | Software signature by the Originator | Firmware code hashed and encrypted using Originator's private key |

TABLE 1-continued

Manufacturer Certificate

| Field Name | Function | Security |
|---|---|---|
| DIE_ID | Die ID number | |
| CONF_PARAM | Platform configuration parameters: DPLL frequency Memory access wait-state Initial values of HW configuration parameters such as RF parameters (filters, gains) or battery management parameters (charging curves) | |
| PLATFORM_DATA | Data related to the hardware Platform: IMEI number ... | |
| SIG_CERT | Certificate signature by the manufacturer | Manufacturer certificate fields hashed and encrypted using Manufacturer's private key |

The certificate size (CERT_SIZE) and certificate type (CERT_TYPE) fields indicate the size and the type (i.e., "manufacturer") of the manufacturer certificate 36. The debug request (DEBUG_REQ) may be set by the manufacturer to enable or disable emulation on the device. As described below, only the manufacturer can set the value of this field. The code address (CODE_ADDR) field indicates the starting address of the code in the external memory 14. The code size field (CODE_SIZE) indicates the size (in bytes) of the firmware. The code starting address (CODE_START_ADDR) indicates the entry point of the firmware at execution.

The manufacturer certificate 36 further includes the manufacturer's public key (MAN_PUB_KEY) and the software originator's public key (ORIG_PUB_KEY); this assumes that the firmware is generated by a third party with its own signature. If the firmware is generated by the manufacturer, a second public key for the manufacturer can be optionally be used. A signature for the originator's public key is generated by hashing ORIG_PUB_KEY and encrypting the hashed ORIG_PUB_KEY using the manufacturer's private key (MAN_PRI_KEY).

A software signature is generated by hashing the code of firmware 30 and encrypting the resulting hashed code using the originator's private key (ORIG_PRI_KEY). Since ORIG_PRI_KEY is private to the originator, the SW_SIG must be provided to the manufacturer by the originator.

The DIE_ID of the particular device 10 is added to the manufacturer certificate 36. This couples the code to a single device, preventing copying of the firmware to a different device.

Configuration parameters are set in the CONF_PARAM field of the manufacturer certificate 36. As described in connection with FIGS. 13 and 14, information in this field can be used to set functionality in the device 10. For example, parameters in the CONF_PARAM field could be used to set DPLL (digital phase lock loop) frequencies, memory access wait states, filter and gain values in the RF circuitry 16, and battery management parameters (such as charging curves).

Data unique to the particular device can be stored in the PLATFORM_DATA field. For example, an IMEI number can be stored in this field. This aspect is described in greater detail in connection with FIG. 12.

A manufacturer certificate signature (SIG_CERT) prevents tampering with any of the fields of the manufacturer certificate 36. The SIG_CERT is generated by hashing the other fields of the manufacturer certificate and encrypting the hashed code with the MAN_PRI_KEY.

Figure 3:
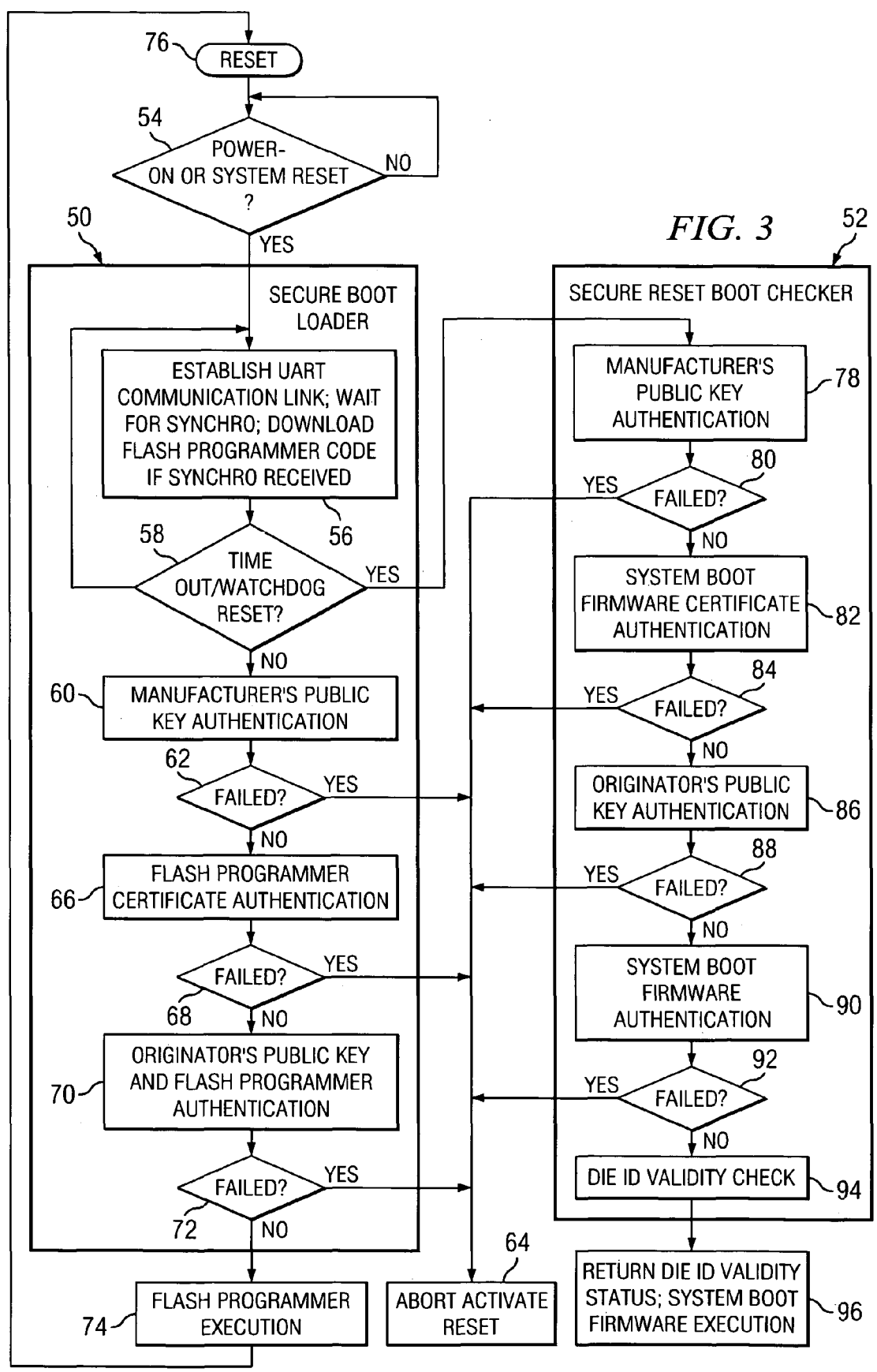
FIG. 3 is a flow chart showing the use of the manufacturer certificate in a secure boot loader and a secure boot checker program.

FIG. 3 is a flow chart showing the use of the manufacturer certificate 36 in a secure boot loader 50 and a secure boot checker program 52, preferably stored ROM 22 to protect the programs from alteration of program flows. The secure boot loader determines whether boot system firmware is available for uploading at power-up. If so, the secure boot loader first loads a flash programmer. The flash programmer is used to load the system boot firmware. The flash programmer must also have a manufacturer certificate 36 and the secure boot loader is responsible for ensuring the authenticity and integrity of the flash programmer's manufacturer certificate and the code of the flash programmer program prior to any execution of the flash programmer. The flash programmer then uploads the system boot firmware.

The secure reset boot checker 52 checks the authenticity and integrity of the certificate of the system boot firmware (and any other firmware) stored in external memory 14 before its execution. Upon execution of the secure boot loader 50 or secure reset boot checker 52, the device 10 is configured to disallow any interruption or other bypassing of their execution prior to completion.

In step 54, the secure boot loader 50 and secure reset boot checker 52 await a power-on or system reset. In step 56, upon a power-on or system reset, the secure boot loader 50 checks a chosen interface, such as the UART (universal asynchronous receiver/transmitter), for a synchronization signal on the interface's physical bus. If no activity is detected on the physical bus after a time-out or a watchdog reset (step 58), then it is assumed that no system firmware download is forthcoming and control switches to the secure reset boot checker 52.

Assuming that download activity is detected on the physical bus, steps 60 through 70 check the manufacturer certificate 36 of the flash programmer prior to any execution of the flash programmer. In step 60, the manufacturer's public key (MAN_PUB_KEY) from the manufacturer certificate of the flash programmer is authenticated. Authentication of MAN_PUB_KEY is illustrated in FIG. 4.

Figure 4:
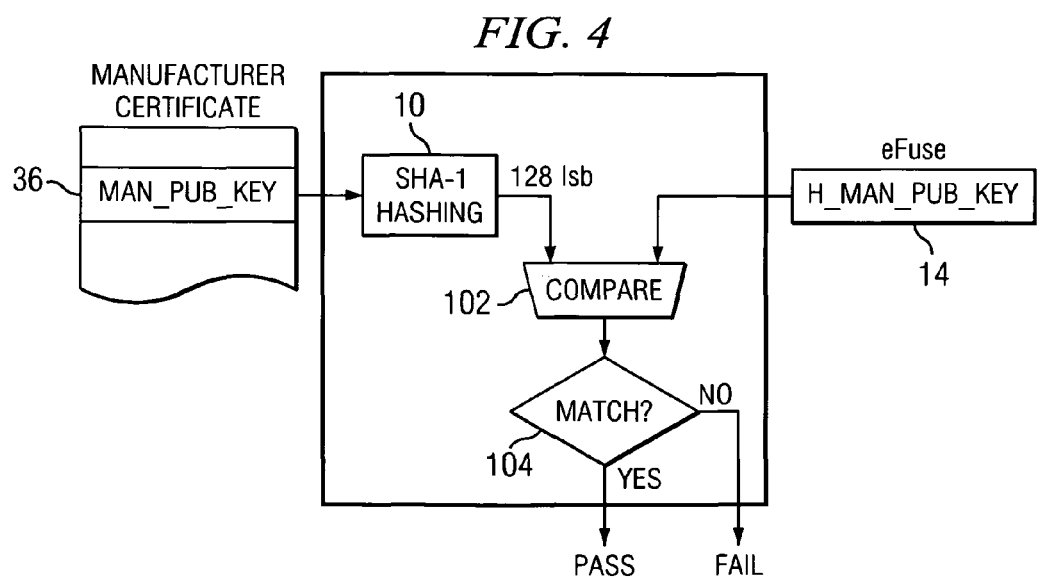
FIG. 4 illustrates a flow chart describing the authentication of the manufacturer's public key as stored in the manufacturer certificate.

FIG. 4 illustrates a flow chart describing the authentication of the manufacturer's public key as stored in the manufacturer certificate 36. In step 100, MAN_PUB_KEY from the manufacturer certificate of the firmware (in this case, the flash programmer) is hashed and, in step 102, the resulting hash is compared to H_MAN_PUB_KEY from the eFuse memory array 24. If there is a match in step 104, then the authentication returns a "pass"; otherwise a fail is returned.

In an alternative embodiment, a hashed value for the manufacturer's public key is stored in manufacturer certificate 36; in this case, hashing step 100 can be eliminated. Also, only a predetermined number of least significant bits of the hashed manufacturer's public key can be stored in the eFuse memory 14; in this case, only corresponding bits would be compared in step 104.

Referring again to FIG. 3, if the authentication of the manufacturer's public key results in a "fail" in step 62, then the process is aborted in step 64, and the loading of the flash programmer ceases. The device 10 is reset and the downloading of the flash programmer can be re-attempted.

If the authentication of the manufacturer's public key results in a "pass" in step 62, then the certificate signature (SIG_CERT) is authenticated in step 66.

Figure 5:
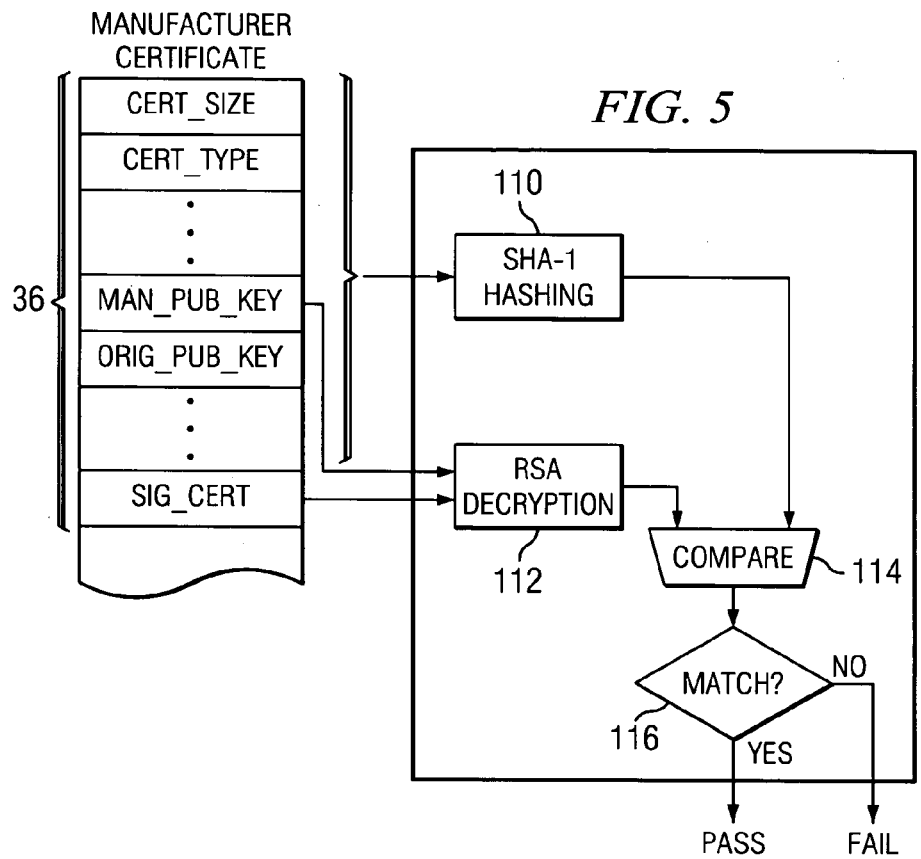
FIG. 5 illustrates a flow chart describing authentication of the certificate signature field in a manufacturer certificate.

FIG. 5 illustrates a flow chart describing the SIG_CERT authentication. In step 110, the fields of the manufacturer certificate 36, other than the SIG_CERT field, are hashed. In step 112, the SIG_CERT field of the manufacturer certificate 36 is decrypted using the MAN_PUB_KEY. It should be noted that the authentication of the manufacturer certificate is performed after the authentication of MAN_PUB_KEY; therefore, the SIG_CERT can only be decrypted properly if it was originally encrypted using the manufacturer's private key. The hash of the certificate from step 110 is compared with the decrypted SIG_CERT in step 114. If there is a match in step 116, then the authentication is passed; otherwise, it is failed. A failed authentication indicates that one or more of the fields of the manufacturer certificate 36 for the firmware have been altered.

Referring again to FIG. 3, if the authentication of the manufacturer certificate signature results in a "fail" in step 68, then the process is aborted in step 64, and the loading of the flash programmer ceases. The device 10 is reset and the downloading of the flash programmer can be re-attempted.

Assuming the authentication of the manufacturer certificate signature passes, then step 70 authenticates the originator's public key field of the manufacturer certificate (ORIG_PUB_KEY) and authenticates the actual firmware code, with respect to the originator's public key and the software signature (SW_SIG).

Figure 6:
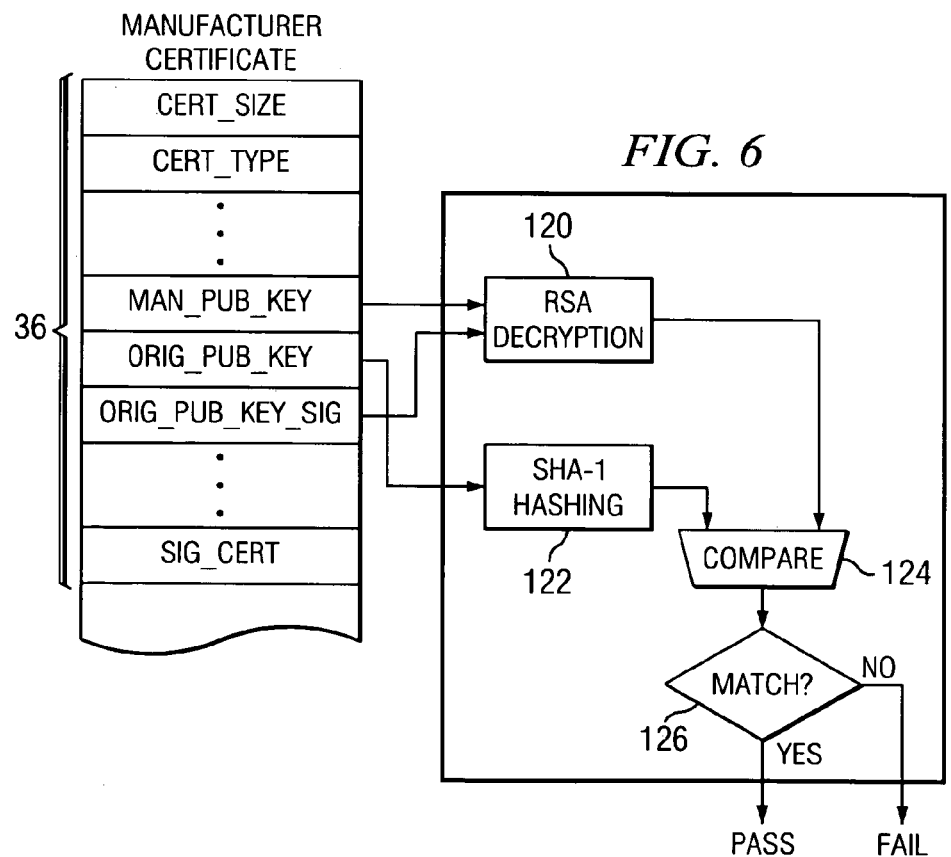
FIG. 6 illustrates a flow chart describing authentication of the originator's public key field in a manufacturer certificate.

FIG. 6 illustrates a flow chart describing the authentication of ORIG_PUB_KEY. In step 120, ORIG_PUB_KEY_SIG is decrypted using MAN_PUB_KEY. The ORIG_PUB_KEY field of the manufacturer certificate 36 is hashed in step 122 and compared to the decrypted signature in step 124. If there is a match in decision block 126, the authentication passes; otherwise it fails, indicating that either the ORIG_PUB_KEY or the ORIG_PUB_KEY_SIG has been modified.

FIG. 7 illustrates a flow chart authenticating the firmware bound to the manufacturer certificate 36. In step 130, the SW_SIG field of the manufacturer certificate 36 is decrypted using the ORIG_PUB_KEY, which has previously been authenticated. In step 132, the firmware 30 is hashed. The resultant hash is compared to the decrypted signature in block 134. If there is a match in decision block 136, the authentication passes; otherwise it fails, indicating that the firmware has been modified.

Referring again to FIG. 3, if the authentication of either the originator's public key or of the firmware (in this case the flash programmer) fails in step 72, then the process is aborted in step 64, and the loading of the flash programmer ceases. The device 10 is reset and the downloading of the flash programmer can be re-attempted.

If all authentication tests are passed, then the flash programmer executes in block 74. The flash programmer loads the system boot software and forces a reset in step 76. Typically, the flash programmer is erased from memory prior to the reset.

The secure reset boot checker 52 will run after a timeout in decision block 58. This will normally happen after completion of a flash programmer execution (unless there is another firmware download) or after a power-on or reset when there is no firmware download pending. The secure reset boot checker authenticates fields in the system boot software, as opposed to the manufacturer certificate of the flash programmer, as discussed in connection with the operation of the secure boot loader.

In step 78, manufacturer's public key of the manufacturer certificate 36 associated with the system boot software is authenticated using the authentication process shown in FIG. 4. If the authentication fails in decision block 80, then the process is aborted in block 64.

If the manufacturer's public key authentication passes in decision block 80, then the system boot firmware certificate (CERT_SIG) is authenticated in block 82. Authentication of the firmware certificate is shown in FIG. 5. If the authentication fails in decision block 84, then the process is aborted in block 64.

If the firmware certificate authentication passes in decision block 84, then the originator's public key (ORIG_PUB_KEY) is authenticated in block 86. Authentication of the originator's public key is shown in FIG. 6. If the authentication fails in decision block 88, then the process is aborted in block 64.

If the originator's public key authentication passes in decision block 88, then the system boot firmware is authenticated in block 90. Authentication of the firmware is shown in FIG. 7. If the authentication fails in decision block 92, then the process is aborted in block 64.

If the firmware authentication passes in decision block 92, then the die identification code is verified in block 94. FIG. 8 is a flow chart describing die identification code verification. In step 140, if the DIE_ID field of the manufacturer certificate 36 is set to "0", then a "0" is returned. Otherwise, the DIE_ID field is compared to the DIE_ID_FUSE value stored in the eFuse memory 14. A value is returned indicating whether or not the two fields matched.

Referring again to FIG. 3, if the DIE_ID field is set to "0", then the Die ID validity status is returned and the process continues in block 96.

If the DIE_ID field is not set to "0", and the die ID in the manufacturer certificate 36 does not match the DIE_ID_FUSE in the eFuse memory 24, then certain features may be disabled; however, some features may remain available, such as the ability to make emergency calls.

The secure boot loader and secure reset boot checker ensure that only valid firmware is loaded onto the device 10, either at the time of manufacture, or for upgrades. User or third party modification or replacement of the stored firmware is prevented, since no system firmware can be loaded without encryption using the manufacturer's private key.

Nonetheless, even with protected installation of the firmware, additional measures are taken to prevent alteration of the firmware, or specific data, during execution of the firmware. This additional security prevents disclosure of data stored in the device by altering execution privileges or the re-use of device 10 with unauthorized firmware.

During operation of the device 10, after loading the system firmware, the secure run-time platform data checker and the secure run-time checker ensure that the system software is not modified and ensures that settings provided in the PLATFORM_DATA field of the manufacturer certificate 36 of the system software.

Figure 9:
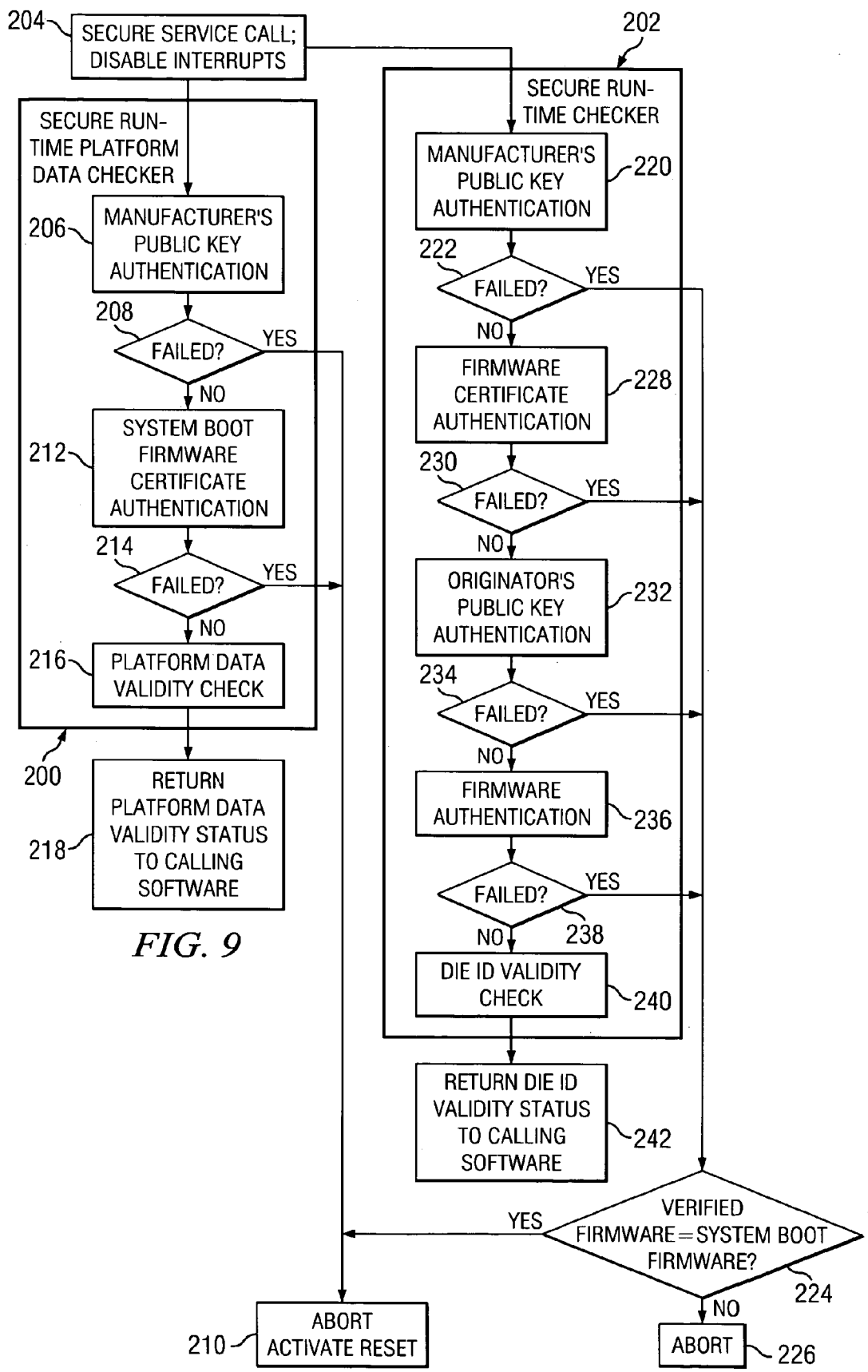
FIG. 9 is a flow chart describing the operation of a secure run-time platform data checker and a secure run-time checker.

FIG. 9 is a flow chart describing the operation of the secure run-time platform data checker and the secure run-time checker. The secure run-time platform data checker 200 prevents alteration of specific data associated with the device 10 that is stored in the PLATFORM_DATA field of the manufacturer certificate 36. The secure run-time checker 202 prevents alteration or swapping of firmware.

In step 204, a secure service call is initiated. In the preferred embodiment, the secure service call is initiated upon detection of a period of inactivity of the processor(s) 26, such that the checkers 200 and 202 cause minimal interference with other applications. The secure service call may also be initiated from an on-chip hardware timer which ensures that the service call is performed within a pre-set time, regardless of available periods of inactivity. The pre-set time can be configured at boot time according the a configuration parameter stored in the CONFIG_PARAM field of the manufacturer certificate 36. Also, a secure service call can be initiated upon a request from a software application. Once the secure service call is initiated, all interrupts are disabled such that the processor executing the secure run-time platform data checker 200 and secure run-time checker 202 cannot be interrupted nor deviated from execution of the checker tasks until completion.

With regard to the secure run-time platform data checker, in step 206, the manufacturer's public key (MAN_PUB_KEY) stored in the manufacturer certificate 36 is authenticated, as previously described in connection with FIG. 4. Authenticating MAN_PUB_KEY prevents substitution of false public key/private key combination for later authentication steps.

If the manufacturer's public key authentication fails in step 208, then the secure run-time platform data checker process 200 is aborted and the device is reset in step 210.

Assuming the manufacturer's public key authentication passes in step 208, then the system boot firmware certificate is authenticated in step 212. Authentication of the system boot firmware certificate is performed as previously described in connection with FIG. 5. This step ensures that no changes have been made to the data in the manufacturer certificate 36, particularly to the values stored in the PLATFORM_DATA field.

If the system boot firmware certificate authentication fails in step 214, then the secure run-time platform data checker process 200 is aborted and the device is reset in step 210.

If the DIE_ID of the manufacturer certificate is not set to zero, then the DIE_ID field is compared to DIE_ID_FUSE stored in the eFuse memory 24. A successful comparison guarantees that the platform related data in the manufacturer certificate belong to the platform. If the DIE_ID of the manufacturer certificate is set to zero, a successful comparison of the PLATFORM_DATA field read from the manufacturer certificate 36 with the PLATFORM_DATA field associated with the platform certificate 38 guarantees that the platform related data in the manufacturer certificate belongs to the platform.

The validity status of the platform data is returned to the calling software (if any) in step 218. If the platform data does not match the expected platform data, certain features of the device may be disabled; however, some features may remain available, such as the ability to make emergency calls.

Steps 220 through 240 describe the operation of the secure run-time checker 202. These steps can be run on each firmware task. In step 220, the manufacturer's public key (MAN_PUB_KEY) stored in the manufacturer certificate 36 of the firmware under test is authenticated, as previously described in connection with FIG. 4. Authenticating MAN_PUB_KEY prevents substitution of false public key/ private key combination for later authentication steps.

If the manufacturer's public key authentication fails in step 222, then, if the firmware under test is the system boot firmware (step 224), the secure run-time checker process 202 is aborted and the device is, reset in step 210. If the firmware under test is other than the system boot firmware, then execution is aborted in step 226.

Assuming the manufacturer's public key authentication passes in step 222, then the firmware certificate (SIG_CERT) of the firmware under test is authenticated in step 228. Authentication of the firmware certificate is performed as previously described in connection with FIG. 5.

If the firmware certificate authentication fails in step 230, then, if the firmware under test is the system boot firmware (step 224), the secure run-time checker process 202 is aborted and the device is reset in step 210. If the firmware under test is other than the system boot firmware, then execution is aborted in step 226.

Assuming the firmware certificate authentication passes in step 230, then the originator's public key (ORIG_PUB_KEY) is authenticated in step 232. Authentication of the ORIG_PUB_KEY of the manufacturer certificate of the firmware under test is performed as described in connection with FIG. 6.

If the originator's public key authentication fails in step 234, then, if the firmware under test is the system boot firmware (step 224), the secure run-time checker process 202 is aborted and the device is reset in step 210. If the firmware under test is other than the system boot firmware, then execution is aborted in step 226.

If the originator's public key authentication passes in step 234, then the firmware is authenticated in step 236. Firmware authentication is performed as described in connection with FIG. 7.

If the firmware authentication fails in step 238, then, if the firmware under test is the system boot firmware (step 224), the secure run-time checker process 202 is aborted and the device is reset in step 210. If the firmware under test is other than the system boot firmware, then execution is aborted in step 226.

If all authentication tests pass, then the Die ID is verified in step 240. Verification of the Die ID is performed as previously described in connection with FIG. 8.

The validity status of the Die ID is returned to the calling software (if any) in step 242. If the DIE_ID field is not set to "0", and the die ID in the manufacturer certificate 36 does not match the DIE_ID_FUSE in the eFuse memory 24, then certain features may be disabled; however, some features may remain available, such as the ability to make emergency calls.

After completion of the checker tasks 200 and 202, if the firmware is successfully tested, previous processing resumes from the point of stoppage and interrupts are re-enabled.

By performing firmware and platform data authentication during execution of the firmware, firmware replacement after initiation can be detected and thwarted. By managing the processor's state before and after executing the checking tasks 200 and 202, the tasks can be executed without re-initialization of the system.

Figure 10:
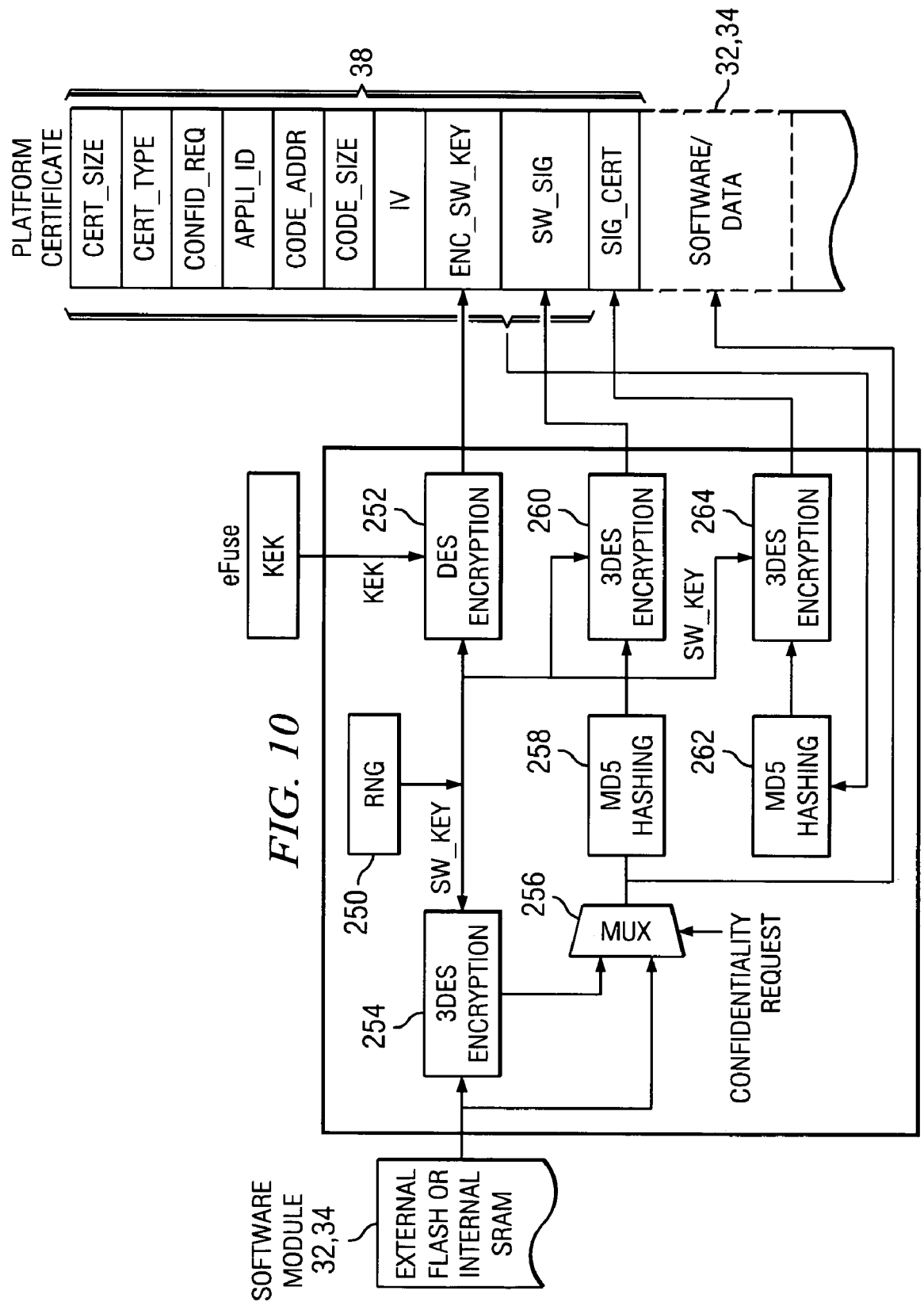
FIG. 10 illustrates the binding of an application file or data file to a computing platform through a platform certificate.

FIG. 10 illustrates the binding of a platform certificate 38 to an application file 32 or data file 34. Table 2 lists the fields for a preferred embodiment of a platform certificate.

TABLE 2

Platform Certificate

| Field Name | Function | Security |
|---|---|---|
| CERT_SIZE | Certificate's size (in bytes) | |
| CERT_TYPE | Certificate's type: Platform | |
| CONFID_REQ | Confidentiality request (S/W encryption) | |
| APPLI_ID | Identifier of the application proprietary of the code and/or data certified by this certificate | |

TABLE 2-continued

Platform Certificate

| Field Name | Function | Security |
|---|---|---|
| CODE_ADDR | Address where are stored the code and/or data to verify | |
| CODE_SIZE | Size of the certified code and/or data (in bytes) | |
| IV | Initial Vector value for bulk encryption/decryption in CBC mode | |
| ENC_SW_KEY | Encrypted SW symmetrical key | Random number encrypted using KEK |
| SW_SIG | Code and/or data signature by the SW symmetrical key | Application code hash encrypted by random number key (SW_KEY) |
| SIG_CERT | Certificate signature by the SW symmetrical key | Manufacturer certificate fields hashed and encrypted by random number key (SW_KEY) |

The platform certificate 38 makes use of the KEK stored in eFuse memory 14. In the preferred embodiment, the KEK is a random number generated on-chip during production, such that the value of the KEK is not known to anyone. The KEK in the eFuse memory 14 such that it is not accessible through I/O ports or to application software. It is desirable that each chip's KEK be used in a manner that it cannot be externally determined or intercepted by other programs. While storage of the KEK in the eFuse memory 14 allows determination through physical observation of the fuses in the fused memory, such observation can only upon destruction of the chip itself; since each chip generates its own KEK, knowledge of one chip's KEK will not compromise the security of other chips.

The KEK is used to encrypt other software keys that are randomly generated during operation of the device. As shown in FIG. 9, a random number generator 250 (which could be either a hardware or software implementation) generates a random software key (SW_KEY) as necessary. Hence, each application may be associated with a different software key. SW_KEY is encrypted using the KEK in step 252 and stored in the platform certificate 38 as ENC_SW_KEY. Since ENC_SW_KEY can only be decrypted using the KEK, and since the KEK is secret and internal to the chip, ENC_SW_KEY can only be decrypted to applications that have access to the KEK. Thus, only the system software in ROM should have access to the KEK.

Other secured values in the platform certificate 38 are encrypted using SW_KEY. Although not part of the certificate itself, the application file 32 or data file 34 may be optionally encrypted by SW_KEY responsive to a confidentiality request as shown in encryption step 254 and 256. Whether or not the application file 32 or data file 34 is encrypted will also affect the software signature (SW_SIG) or signature certificate (SIG_CERT). The software file 32 or data file (optionally encrypted) is hashed in step 258 and encrypted by SW_KEY in step 260. This value is stored as SW_SIG. The certificate fields are hashed in step 262 and encrypted by SW_KEY in step 264. This value is store as SIG_CERT.

The platform certificate associates an application or data file with the device 10 upon which it is loaded. Once associated, the application or data file cannot be transferred to another device, since the platform certificate will be invalid. Further, the APPLI_ID field can be used to associate an application file 32 or data file 34 with a particular program. This could be used, for example, to allow access to an audio or video file only in connection with a specific media player application, even if the format of the audio or video file was a standard format capable of being played by various applications.

Figure 11:
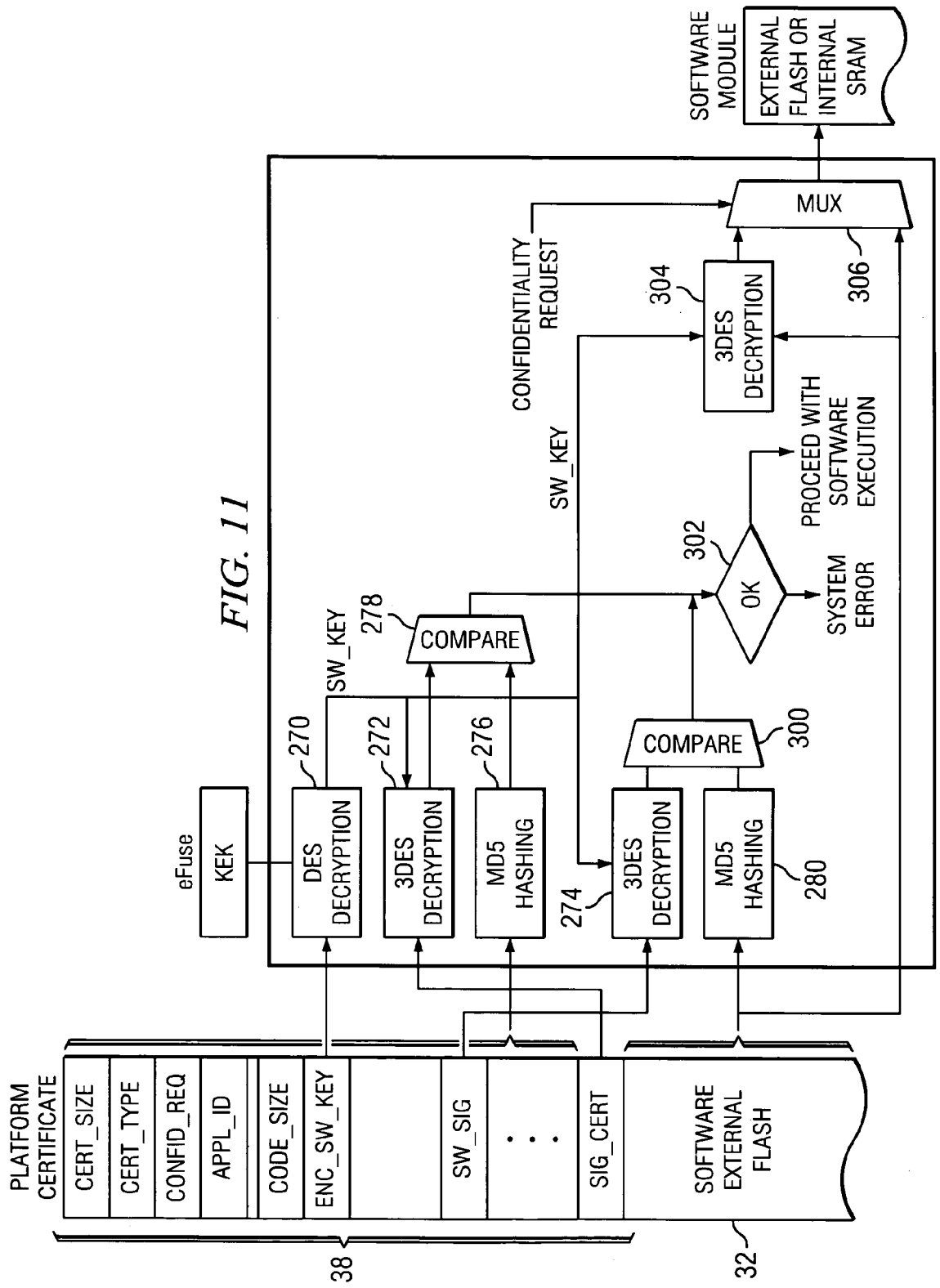
FIG. 11 illustrates the unbinding of an application or data file from the platform certificate necessary to execute the application or use the data file within an application.

FIG. 11 illustrates the unbinding of an application or data file from the platform certificate necessary to execute the application or use the data file within an application. In step 270, SW_KEY is derived from the ENC_SW_KEY of the platform certificate 38 using the KEK from eFuse memory 14. SW_KEY is used to decrypt the SIG_CERT field of platform certificate 38 in step 272 and to decrypt the SW_SIG field in step 274.

The fields of the platform certificate 38, other then the SIG_CERT field are hashed in step 276. The hash is compared to the decrypted SW_CERT field in step 278. Similarly, the stored application or data file is hashed in step 280 and the hash is compared to the decrypted SW_SIG field from step 274 in step 282. If either the comparison in step 278 or the comparison in step 300 indicates a mismatch, a system error occurs in step 302. Otherwise, the application is executed (or the data file is used by an application) after optional decryption in steps 304 and 306.

The platform certificate provides significant advantages over the prior art. The binding of a software or data file to a device 10 helps to uncover any modification of the original software module and prevents any copy of the source from running on another similar platform, offering an efficient protection against cloning attacks, specifically important for copyright management and media protection.

The solution offers a high level of security since it is based on strong cryptographic techniques, such as one-way hash and bulk encryption, for platform signature and verification. The solution can easily be adapted to any computing hardware platform. The use of the KEK and a software key randomly-generated at the time of binding allows for external storage of the encrypted key in external memory. An unlimited number of different software keys can be used for the application and data files. Further, the use of symmetric bulk encryption techniques for the calculation of the signatures significantly reduces processor computing loads relative to asymmetric techniques.

Figure 12:
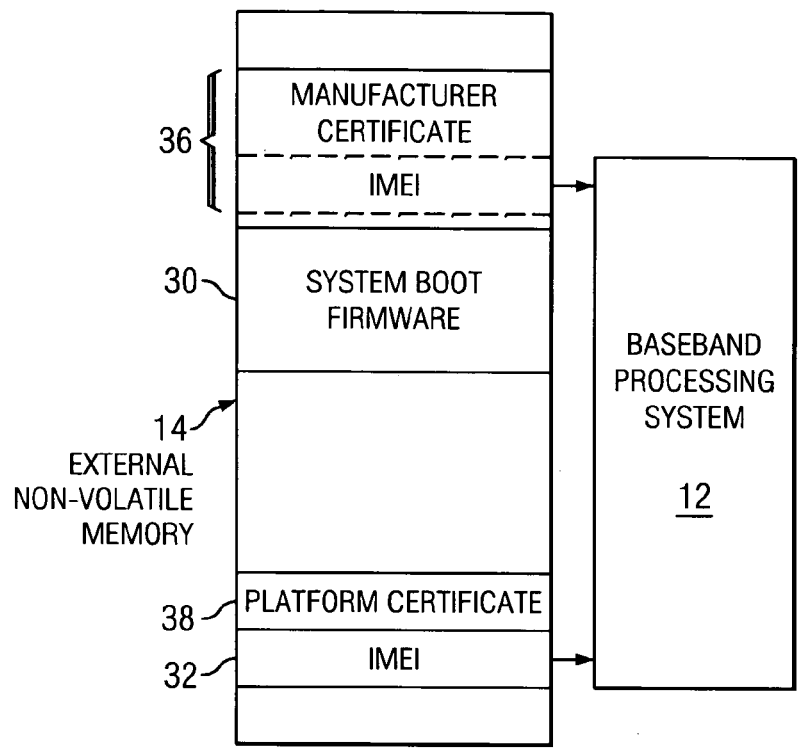
FIG. 12 describes a particular use of the manufacturer and/or platform certificate to securely store a IMEI (International Mobile Equipment Identity) number in external memory.

FIG. 12 describes a particular use of the manufacturer and/or platform certificate to securely store a IMEI (International Mobile Equipment Identity) number in external memory. The IMEI number is specified in the UMTS (Universal Mobile Telephone Service) standard, release 5, to protect both the phone manufacturer and the operator against clones and obsolete or non-conforming user equipment. The IMEI number must be stored somewhere in the mobile phone and sent to the serving network on demand. The protection of the IMEI number against tampering by any means (hardware, software or physical) has significantly increased the required security level of mobile devices. To prevent tampering, many manufacturers have stored the IMEI number, which is unique for each phone, on the chip late in the production process. Storing the number on-chip in a manner which is tamper-proof, however, is an expensive proposition.

As shown in FIG. 12, the IMEI can be stored in external memory in the manufacturer certificate (specifically, the PLATFORM_DATA field), which is customized for each phone, and/or in external memory bound to a platform certificate. The baseband processing system 12 can access the IMEI in external memory either from the manufacturer certificate 36 of the system boot firmware or from a memory location bound to a platform certificate 38.

If the IMEI number is changed in the PLATFORM_DATA field of the manufacturer certificate 36, it will be detected by the secure reset boot checker prior to execution of the system boot software. If changed after the system boot software is loaded, a change in the IMEI number will be detected by the secure run-time platform data checker.

If the IMEI is stored in external memory bound to a platform certificate, any change in the IMEI will be detected as an invalid SW_SIG. Using the platform certificate, the IMEI can be stored in any location in the external memory.

The device 10 can be programmed to allow emergency calls even if the IMEI results in an invalid manufacturer certificate 36 or invalid platform certificate 38.

Figure 13:
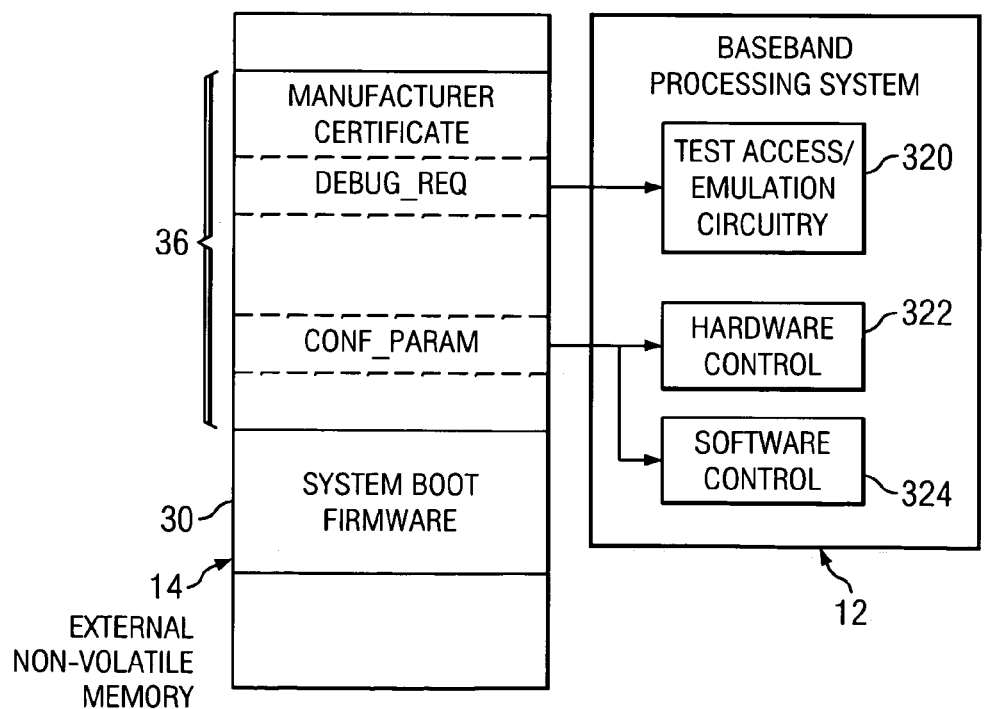
FIG. 13 illustrates a block diagram of using fields in the manufacture certificate to control the operation of the device.

FIG. 13 illustrates a block diagram for using fields in the manufacture certificate 36 to control the operation of the device 10. As shown in FIG. 13, the DEBUG_REQ field of the manufacturer certificate 36 is used to control test access and emulation circuitry 320. Parameters set forth in the CONF_PARAM field of the manufacturer certificate 36 can be used to control any aspect of the operation of device 10, by configuring hardware or software appropriately, as shown in blocks 322 and 324.

In operation, the system boot software accesses the configuration parameters from the manufacturer's certificate to configure the hardware and software resources. Placing the configuration parameters in the manufacturer's certificate 36 allows the manufacturer to design a device that has flexible hardware and/or software configurations and safely and securely configure the device as appropriate.

One use of securely storing configuration parameters in a manufacturer's certificate 36 would be to allow the device 10 to enter configurations in controlled situations, where the configuration would leave the device 10 vulnerable to attack. For example, during a test mode, the device 10 could be placed in a configuration where certain normally hidden memory locations would be accessible to reading and/or writing. Also, certain hardware parameters, such as memory performance settings, bus speeds, processing speeds, and so on, may be changed during a test mode for analyzing system operations.

A second use of securing storing configuration parameters in a manufacturer's certificate would be to control the performance of a device 10. As is well known in the computing industry, some users reconfigure hardware and/or software parameters to push a device to its limits. For example, many user's "overclock" a personal computers processor speed by changing the system clock speed or the multiple of the system clock at which the processor operates. Additionally, memory settings can be changed to improve memory access and throughput. While overclocking can improve the performance of a computing device, it can also reduce hardware lifetimes by operating hardware at temperatures beyond their specification. Further, computing devices may operate erratically at the overclocked settings. Overclocked settings can thus be costly to manufacturers in terms of warranty and support.

By setting parameters in the manufacturer certificate 36, attempts to change performance settings would be thwarted, since the settings are defined in the manufacture certificate 36, which can only be changed under the authority of the manufacturer. System boot software would configure the device after a reset to the defined parameters. Any attempt to change the authorized settings in the certificate would be detected by the secure reset boot checker 52 (after a reset)

or the secure run-time checker 202. Any attempt to change the configuration parameters by software outside of the system firmware would be detected by the secure run-time platform data checker 200.

A third use of securing storing configuration parameters in a manufacturer's certificate would be to provide a single device that has different performance capabilities and/or different functionality settings. The device could be sold according to its configuration settings, which are stored in the manufacturer certificate 36, such that the configurations could not be modified by the user or a third party. The device 10 could be easily upgraded by the manufacturer.

For example, a mobile computing device platform could be designed to run at multiple processor speeds and have different optional functionalities, such as wireless networking, audio and video capabilities. The device could be sold at a desired configuration that could be upgraded at a later date without expensive hardware upgrades, such as PC cards or memory port enhancements.

FIG. 14 illustrates a variation on FIG. 13 where configuration data is stored in a data file 34 protected by a platform certificate. Any attempt to change the data file 34 storing the configuration parameters would be detected by the system firmware. The secure run-time platform data checker 200 could be modified to check the contents of the data file during operation of the device.

FIG. 15 illustrates an alternative design for accessing the device 10 is a certain mode, such as a test mode shown in FIG. 15. This design stores the hash of an access code (H_Test_ID). This code could be stored the eFuse memory 24. To access the test mode, the party would need to enter an access code (Input_Test_ID). Input_Test_ID is hashed in block 330 and compared to H_Test_ID in block 332. If the hashed access code from block 330 matches the stored hashed access code, then entry to the mode is enabled.

In operation, the H_Test_ID will normally be significantly smaller in size than Input_Test_ID, reducing the storage space needed to store the access code. To gain entry to the desired mode, however, a party will need to supply a much larger number. While it is possible multiple inputs may hash to match H_Test_ID, it is statistically improbable that an improper input access code will result in a match using present day hashing algorithms such as SHA-1 or ND5.

Additionally, the design of FIG. 15 provides an additional security benefit. Even if the stored hash, H_Test_ID, becomes known, determination of an input code which would hash to H_Test_ID would be computationally difficult.

While the use of the hashed access code has been described in connection with test mode access, it could be used to provide security in any appropriate situation, such as access to change system parameters, as discussed above.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

The invention claimed is:

1. A computing device comprising:
   a processing system;
   an externally-accessible memory coupled to the processing system;
   a secret identification number generated for the computing device and stored in a secure memory that is not externally-accessible;
   a key generator for generating a random key associated with a selected electronic file to be stored in the externally-accessible memory;
   a symmetrical encryption system to generate an encrypted key by symmetrically encrypting the random key using the secret identification number;
   wherein the processing system associates a digital certificate with an electronic file, where the digital certificate contains the encrypted key, such that the electronic file can be accessed only after the processing system restores the random key through decryption of the encrypted key with the secret identification number;
   wherein the random key is used to sign the digital certificate, the electronic file is encrypted using the random key, the electronic file is accessed when the digital certificate is verified using the random key and the encrypted electronic file is decrypted using the random key; and
   the externally-accessible memory further comprising an asymmetric manufacture certificate to bind firmware to the processing system.

2. The computing device of claim 1 wherein digital certificate contains a software signature; wherein the software signature comprises a hash of the electronic file that is symmetrically encrypted using the random key.

3. The computing device of claim 2 wherein the digital certificate further contains a signature for selected fields of the digital certificate, wherein the selected fields of the digital certificate are hashed and encrypted using the random key.

4. The computing device of claim 1, wherein the encrypted key is stored in the externally-accessible memory.

5. The computing device of claim 1
   wherein the encryption of the electronic file can be bypassed and the digital certificate allows modification detection and authentication of the electronic file.

6. The computing device of claim 5 wherein the random key directly encrypts the electronic file, without an additional level of encryption.

7. The computing device of claim 1 further comprising
   an internal permanent memory in the processing system;
   the internal permanent memory for storing a first manufacturer's public key, wherein the first manufacturer's public key is optionally hashed and cannot be modified after writing into permanent memory;
   the externally-accessible memory comprises the manufacturer certificate for asymmetric encryption and for prevention of firmware modification and copying; wherein the manufacturer certificate comprises a second manufacturer's public key; and
   the processor for comparing the first and second manufacturer public keys and generating a pass or fail output to indicate a match.

8. The device of claim 7 wherein a hashed value of the second manufacturer's public key is stored in the manufacturer certificate.

9. A method of providing security to files stored in an externally-accessible memory of a computing device comprising the steps of:
   storing a secret identification number for the computing device in a secure memory that is not externally-accessible;
   generating a random key;
   generating an encrypted key by symmetrically encrypting the random key using the secret identification number;
   associating a digital certificate with an electronic file, where the digital certificate contains the encrypted key, such that the electronic file can be accessed only after restoring the random key through decryption of the encrypted key with the secret identification number;

using the random key to sign the digital certificate, and encrypting the electronic file using the random key, and wherein the electronic file is accessed when the digital certificate is verified using the random key and the encrypted electronic file is decrypted using the random key; and binding firmware to the computing device by an asymmetric manufacture certificate in the externally-accessible memory.

10. The method of claim 9 wherein the associating step includes the step of generating a software signature encrypted using the random key and storing the software signature in the digital certificate; wherein the software signature comprises a hash of the electronic file that is symmetrically encrypted using the random key.

11. The method of claim 10 wherein the associating step includes the step of generating a signature for selected fields of the digital certificate, wherein the selected fields of the digital certificate are coded and encrypted using the random key.

12. The method of claim 9 and further comprising the step of storing the encrypted key in the externally-accessible memory.

13. The method of claim 9 and further comprising the step of symmetrically decrypting the encrypted key using the secret identification number upon a request to access the electronic file.

14. The method of claim 13 and further comprising the step of decrypting one or more fields of the digital certificate using the encrypted key.

15. The method of claim 14 and further comprising the step of decrypting an encrypted electronic file using the encrypted key.

* * * * *